(12) United States Patent
Trinelli et al.

(10) Patent No.: US 12,425,404 B2
(45) Date of Patent: Sep. 23, 2025

(54) MULTI-TENANTED AUTHENTICATION FOR APPLICATIONS

(71) Applicant: Cisco Technology, Inc., San Jose, CA (US)

(72) Inventors: Marco Trinelli, Lausanne (CH); Mohamed Tahar Kedjour, Asnières-sur-Seine (FR); Jean Diaconu, Gaillard (FR); Márk Sági-Kazár, Gyömrő (HU); Sándor Szilárd Magyari, Budapest (HU)

(73) Assignee: CISCO TECHNOLOGY, INC., San Jose, CA (US)

( * ) Notice: Subject to any disclaimer, the term of this patent is extended or adjusted under 35 U.S.C. 154(b) by 215 days.

(21) Appl. No.: 18/459,093

(22) Filed: Aug. 31, 2023

(65) Prior Publication Data

US 2025/0080530 A1    Mar. 6, 2025

(51) Int. Cl.
*H04L 9/40* (2022.01)

(52) U.S. Cl.
CPC ........ *H04L 63/0884* (2013.01); *H04L 63/083* (2013.01)

(58) Field of Classification Search
CPC ............... H04L 63/0884; H04L 63/083; H04L 63/0807; H04L 63/0815
See application file for complete search history.

(56) References Cited

U.S. PATENT DOCUMENTS

| | | |
|---|---|---|
| 2015/0007263 A1 | 1/2015 | Stewart et al. |
| 2015/0089604 A1* | 3/2015 | Mathew ............. H04L 65/1069 709/228 |
| 2018/0077144 A1 | 3/2018 | Gangawane et al. |
| 2018/0219854 A1 | 8/2018 | Miran et al. |
| 2019/0132397 A1* | 5/2019 | Luczynski ............ H04L 67/141 |
| 2020/0213297 A1 | 7/2020 | Suraparaju |

FOREIGN PATENT DOCUMENTS

WO    2017196774 A1    11/2017

* cited by examiner

*Primary Examiner* — Huan V Doan
(74) *Attorney, Agent, or Firm* — Baker Botts L.L.P.

(57) ABSTRACT

In one embodiment, a method comprises accessing information associated with a user that is trying to login to an application, generating a first session identifier corresponding to the information, sending a first notification to an authentication client that the user is trying to login using an authentication service, receiving a first request from an authentication provider for authenticating a second session identifier, determining that the second session identifier is identical to the first session identifier by comparing the second session identifier with stored first session identifier, and causing the authentication provider to patch one or more authentication tokens with the information regarding the tenant, where the one or more authentication tokens are used for accessing the application.

20 Claims, 5 Drawing Sheets

MULTI-TENANTED AUTHENTICATION FOR APPLICATIONS

TECHNICAL FIELD

The present disclosure relates generally to security in distributed computing environments, and more particularly, to multi-tenanted authentication for applications.

BACKGROUND

Contemporary cloud-native modern software, including traditional web applications and single-page applications, may need to scale with the number of users and tenants. A tenant may be a unique entity comprising users and corresponding configurations. OpenID Connect (OIDC) may allow those applications to verify an identity of a user and to obtain profile information associated with the user. OIDC may enable one login for multiple applications. Each time a user needs to login to an application using OIDC, the user is redirected to an OIDC service provider where the user is authenticated and authorized, and then taken back to the application. While OIDC allows to offload authentication and authorization from those applications, OIDC may not enable multi-tenancy in such applications. Furthermore, certain applications may need specific tenant information such as a tenant creation time, a last-access time, etc. OIDC is not capable of providing such specific tenant information to the applications.

DESCRIPTION OF EXAMPLE EMBODIMENTS

Overview

Figure 1:
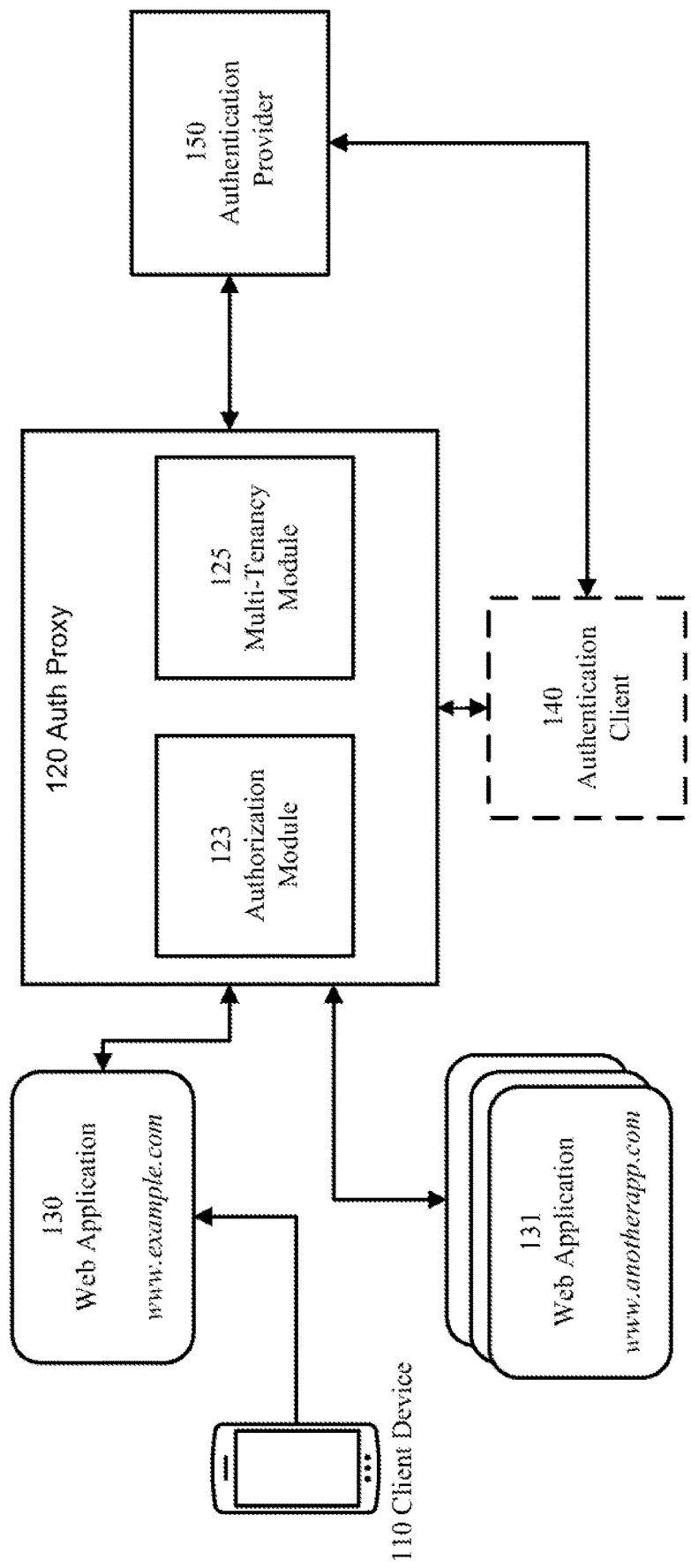
FIG. 1 illustrates an example logical architecture for enabling multi-tenanted authentications for applications.

In one or more embodiments, a method, by a computing system, may comprise access information associated with a user that is trying to login to an application. The information may comprise an identity of the user and information regarding a tenant to which the user belongs. The method may comprise generating a first session identifier corresponding to the information. The first session identifier in association with the identity of the user and the information regarding the tenant may be stored to a first storage communicatively connected to the computing system. The method may comprise sending a first notification to an authentication client that the user is trying to login using an authentication service. The first notification may comprise the first session identifier. The one or more identifiers may comprise the particular identifier. The method may comprise receiving a first request from an authentication provider for authenticating a second session identifier. The method may comprise determining that the second session identifier is identical to the first session identifier by comparing the second session identifier with the stored first session identifier. The method may further comprise causing the authentication provider to patch one or more authentication tokens with the information regarding the tenant in response to the determination. The one or more authentication tokens may be used for accessing the application.

In particular embodiments, a computing system may comprise one or more processors, and one or more computer-readable non-transitory storage media coupled to one or more of the processors. The one or more computer-readable non-transitory storage media may comprise instructions operable when executed by one or more of the processors to access information associated with a user that is trying to login to an application. The information may comprise an identity of the user and information regarding a tenant to which the user belongs. The processors are further operable when executing the instructions to generate a first session identifier corresponding to the information. The first session identifier in association with the identity of the user and the information regarding the tenant may be stored to a first storage communicatively connected to the computing system. The processors are further operable when executing the instructions to send a first notification to an authentication client that the user is trying to login using an authentication service. The first notification may comprise the first session identifier. The processors are further operable when executing the instructions to receive a first request from an authentication provider for authenticating a second session identifier. The processors are further operable when executing the instructions to determine that the second session identifier is identical to the first session identifier by comparing the second session identifier with the stored first session identifier. The processors are further operable when executing the instructions to cause the authentication provider to patch one or more authentication tokens with the information regarding the tenant in response to the determination. The one or more authentication tokens may be used for accessing the application.

In one or more embodiments, one or more computer-readable non-transitory storage media may embody software that is operable, when executed by a computing system, to access information associated with a user that is trying to login to an application. The information may comprise an identity of the user and information regarding a tenant to which the user belongs. The software may be further operable when executed by the computing system to generate a first session identifier corresponding to the information. The first session identifier in association with the identity of the user and the information regarding the tenant may be stored to a first storage communicatively connected to the computing system. The software may be further operable when executed by the computing system to send a first notification to an authentication client that the user is trying to login using an authentication service. The first notification may comprise the first session identifier. The software may be further operable when executed by the computing system to receive a first request from an authentication provider for authenticating a second session identifier. The software may be further operable when executed by the computing system to determine that the second session identifier is identical to the first session identifier by comparing the second session identifier with the stored first session identifier. The software may be further operable when executed by the computing system to cause the authentication provider to patch one or more authentication tokens with the information regarding the tenant in response to the determination. The one or more authentication tokens may be used for accessing the application.

Example Embodiments

In particular embodiments, a computing system may provide an application with information associated with a tenant in association with a user by causing an authentication service provider to patch one or more authentication tokens with the information regarding the tenant. Contemporary cloud-native modern software, including traditional web applications and single-page applications, may need to scale with the number of users and tenants. A tenant may be a unique entity comprising users and corresponding configurations. Third-party authentication protocols including OpenID Connect (OIDC) may allow those applications to verify an identity of a user and to obtain profile information associated with the user. OIDC may enable one login for multiple applications. Each time a user needs to login to an application using OIDC, the user is redirected to an OIDC service provider where the user is authenticated and authorized, and then taken back to the application. While OIDC allows to offload authentication and authorization from those applications, OIDC may not enable multi-tenancy in such applications. A user can configure a list of tenants using a specific OIDC provider that supports this feature to resolve the multi-tenancy issue. However, this approach does not scale with the number of tenants, as configuration can be complex, and works only for OIDC provider supporting realms or any other group notion. Furthermore, certain applications may need specific tenant information such as a tenant creation time, a last-access time, etc. OIDC is not capable of providing such specific tenant information to the applications. A computing system disclosed herein may work as a proxy between an application and an authentication service provider and cause the authentication service provider to patch one or more authentication tokens with tenant specific information. The application may learn the tenant specific information based on the patched one or more authentication tokens. The disclosed solution may work with legacy applications without requiring the legacy applications to be modified.

FIG. 1 illustrates an example logical architecture for enabling multi-tenanted authentications for applications. A user may access a web application 130 www.example.com using a client device 110 associated with the user. The web application 130 may offload authentication of the user using an authentication service provider 150. In order to support multi-tenanted authentications, an auth proxy 120 may be deployed between the web application 130 and the authentication service provider 150. The auth proxy 120 may comprise an authorization module 123 and a multi-tenancy module 125. In particular embodiments, the auth proxy 120 may also comprise an authentication client 140 if the web application 130 does not have a native authentication client 140. In particular embodiments, the authentication client 140 may be a part of the web application 130. The auth proxy 120 may serve one or more additional web applications in addition to the web application 130. The one or more additional web applications may include a web application 131 www.anotherapp.com. Although this disclosure describes a particular architecture for enabling multi-tenanted authentications for applications, this disclosure contemplates any suitable architecture for enabling multi-tenancy authentications for applications.

In particular embodiments, a computing system may access information associated with a user that is trying to login to an application. In particular embodiments, the application may be a web application. A tenant may be a unique entity comprising users and configurations. The information may comprise an identity of the user and information regarding a tenant to which the user belongs. The information regarding the tenant may comprise an identifier and a name of the tenant. The information regarding the tenant may further comprise a creation time of the tenant or a last access time to the tenant. The computing system may function as an auth proxy comprising an authorization module and a multi-tenancy module. The computing system may be communicatively connected to a first storage comprising a list of tenants and their corresponding information. Although this disclosure describes a particular information associated with a user that is trying to login to an application, this disclosure contemplates any suitable information associated with a user that is trying to login to an application.

Figure 2:
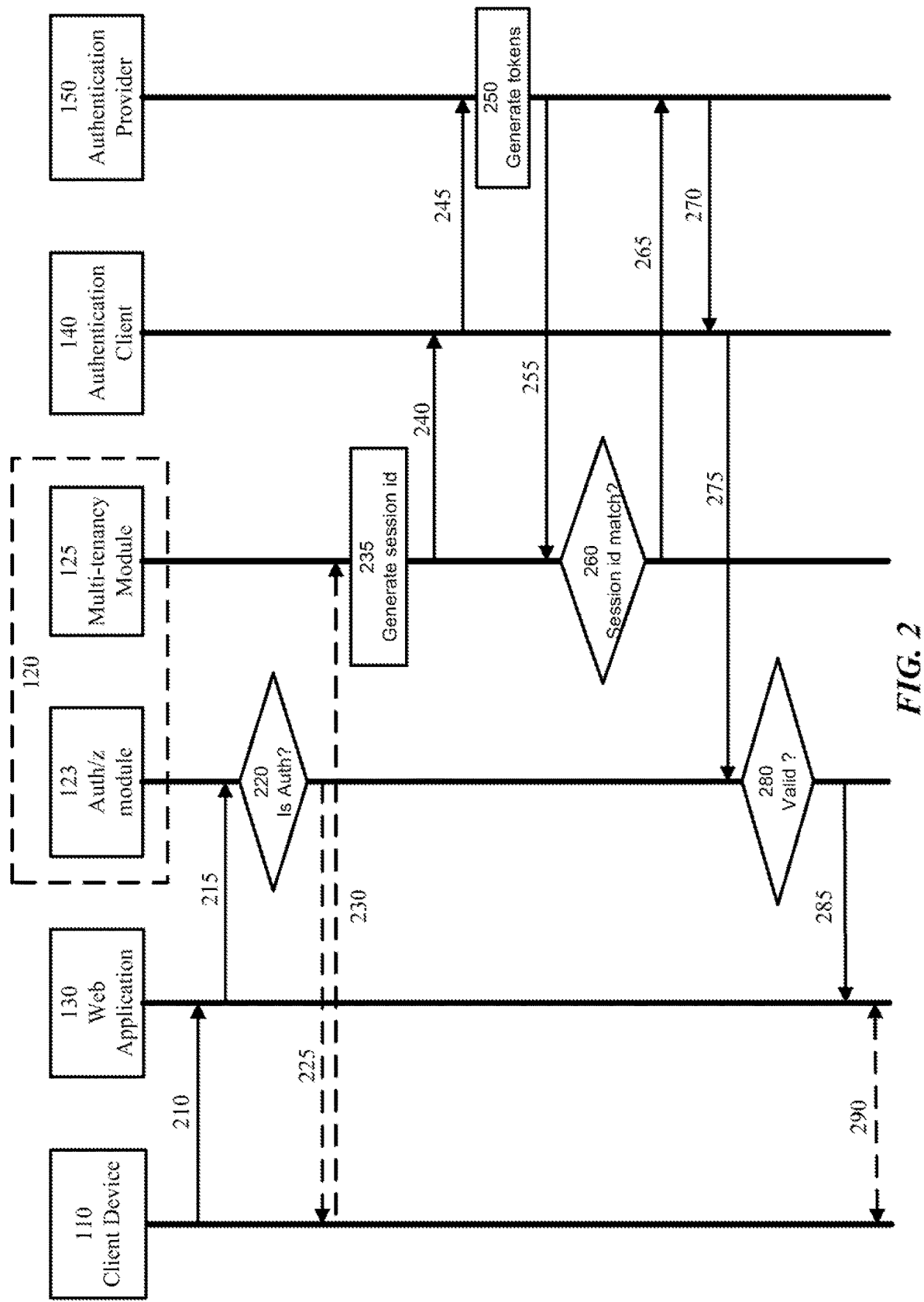
FIG. 2 illustrates an example message flow for authenticating a user associated with a tenant for a first time.

In particular embodiments, the computing system may be involved with a number of steps to access the information associated with the user. The computing system may receive a first message from the application accessed by the user indicating that the user is not authorized to access the application. The first message may be redirected by a gateway associated with the application. The first message may comprise an identity of the user. In particular embodiments, the first message is an error message with an unauthorized response status code returned by the application. The first message with the unauthorized response status code may be intercepted and redirected to the computing system by the gateway. The computing system may have a connection with a client device associated with the user upon receiving the first message. The computing system may determine the user is not authenticated based on records in a second storage communicatively connected to the computing system. The computing system may receive an identity information of a tenant the user is associated with while the user is accessing the application from the client device by causing the client device to present a user interface for the user to provide the identity information of the tenant. The computing system may retrieve further information regarding the tenant from the first storage communicatively connected to the computing system using the identity information of the tenant. FIG. 2 illustrates an example message flow for authenticating a user associated with a tenant for a first time. As an example and not by way of limitation, illustrated in FIG. 2, a user may access a web application 130 for a first time using a client device 110. At step 210 the client device 110 may send an initial message to the web application 130. The web application 130 may determine that the user is not authorized to access the application 130 and send a response message indicting the access is not authorized. In particular embodiments, the response message may comprise HyperText Transfer Protocol (HTTP) '401' status code indicating that the client request has not been completed because the request lacks valid authentication credentials for the requested resource. At step 215, a gateway associated with the web application 130 may intercept the response message and forward the response message to the authorization module 123 of an auth proxy 120. At step 220, the authorization module 123 may determine whether the user is authenticated to access the web application 130 based on information stored at a second storage communicatively connected to the authentication module 123. In response to a determination that the user is not authenticated to access the web application 130, the authentication module 123 may cause the client device to present a user interface to provide tenant identity information at step 225. In particular embodiments, the multi-tenancy module 125, instead of the authentication module 123, may cause the client device to present a user interface to provide tenant identity information at step 225. At step 230, the client device 110 may send a tenant identity information provided by the user to the auth proxy 120. In particular embodiments, the multi-tenancy module 125 may retrieve additional tenant information associated with the received tenant identity information from a storage communicatively connected with the multi-tenancy module 125. Although this disclosure describes accessing information associated with a user that is trying to login to an application in a particular manner, this disclosure contemplates accessing information associated with a user that is trying to login to an application in any suitable manner.

In particular embodiments, the computing system may generate a first session identifier corresponding to the information. The first session identifier in association with the identity of the user and the information regarding the tenant may be stored to the first storage communicatively connected to the computing system. As an example and not by way of limitation, continuing with a prior example, the multi-tenancy module 125 may generate a session identifier corresponding to the received information associated with the user at step 235. The generated session identifier may allow to keep the authentication client 140 and the authentication service provider 150 tenant-agnostic. In particular embodiments, the session identifier may be a randomly generated string. The multi-tenancy module 125 may store the generated session identifier in association with a user identity and information regarding the tenant. Although this disclosure describes generating a session identifier corresponding to information associated with a user in a particular manner, this disclosure contemplates generating a session identifier corresponding to information associated with a user in any suitable manner.

In particular embodiments, the computing system may send a first notification to an authentication client that the user is trying to login using an authentication service. The first notification may comprise the first session identifier. In particular embodiments, the authentication client may be an OIDC client. The first notification may cause the authentication client to initiate an authentication procedure by sending a message comprising the first session identifier request to an authentication provider. In particular embodiments, the authentication provider may be an OIDC service provider. As an example and not by way of limitation, continuing with a prior example, at step 240, the multi-tenancy module 125 may send a notification to the authentication client 140 indicating that the user is trying to login to the web application 130 using an authentication protocol that the authentication client 140 supports. The authentication client 140 may be a part of the auth proxy 120. In particular embodiments, the authentication client 140 may be a part of the web application 130. In particular embodiments, the authentication protocol may be OIDC, and the authentication client 140 may be an OIDC client. The OIDC client may be a tenant-agnostic legacy OIDC client. The notification may comprise the first session identifier. At step 245, the authentication client 140 may initiate an authentication procedure by sending a message to the authentication service provider 150 comprising the first session identifier. In particular embodiments, the authentication service provider 150 may be an OIDC service provider. At step 250, the authentication service provider 150 may generate one or more authentication tokens. The one or more authentication tokens may comprise an access token, an ID token, and a refresh token used in OIDC. Although this disclosure describes causing an authentication client to initiate an authentication procedure by sending a notification to the authentication client in a particular manner, this disclosure contemplates causing an authentication client to initiate an authentication procedure by sending a notification to the authentication client in any suitable manner.

In particular embodiments, the computing system may receive a first request from the authentication provider for authenticating a second session identifier. The authentication provider may send the first request to the computing system by calling a pre-configured inline hook. As an example and not by way of limitation, continuing with a prior example, the authentication service provider may provide at least a method for configuring one or more hook functions. A particular hook function may be pre-configured at the authentication service provider 150. At step 255, the authentication service provider 150 may call the particular hook function, which sends a first request message to the multi-tenancy module 125. The first request message may comprise the first session identifier that the authentication service provider 150 received from the authentication client 140. Although this disclosure describes receiving a first request message from an authentication service provider in a particular manner, this disclosure contemplates receiving a first request message from an authentication service provider in any suitable manner.

In particular embodiments, the computing system may determine that the second session identifier is identical to the first session identifier by comparing the second session identifier with the stored first session identifier. As an example and not by way of limitation, continuing with a prior example, the multi-tenancy module 125 may retrieve the stored session identifier and compare the retrieved session identifier and the session identifier received within the first request message at step 260. Although this disclosure describes verifying a session identifier received within a request message in a particular manner, this disclosure contemplates verifying a session identifier received within a request message in any suitable manner.

In particular embodiments, the computing system may call one or more first application programming interfaces (APIs) provided by the authentication provider to cause the authentication provider to patch one or more authentication tokens with the information regarding the tenant in response to the determination. In particular embodiments, the computing system may call one or more second APIs provided by the authentication provider to cause the authentication provider to sign the one or more authentication tokens with the information regarding the tenant. The one or more authentication tokens may be used for accessing the application. As an example and not by way of limitation, continuing with a prior example, the multi-tenancy module 125 may call one or more APIs provided by the authentication service provider 150 upon determining that the retrieved session identifier and the received session identifier match at step 265. The one or more APIs may cause the authentication service provider 150 to patch the one or more authentication tokens associated with the session identifier with information regarding the tenant. The information regarding the tenant may comprise an identifier of the tenant, a name of the tenant, a creation time of the tenant, a last access time of the tenant, or any suitable information associated with the tenant. In particular embodiments, the one or more APIs may further cause the authentication service provider 150 to sign the patched authentication tokens associated with the session identifier with the information regarding the tenant. Although this disclosure describes causing the authentication service provider to patch one or more authentication tokens associated with a session identifier with information regarding a tenant in a particular manner, this disclosure contemplates causing the authentication service provider to patch one or more authentication tokens associated with a session identifier with information regarding a tenant in any suitable manner.

In particular embodiments, the computing system may receive the patched one or more authentication tokens from the authentication client. The computing system may determine that the patched one or more authentication tokens are valid. In response to the determination, the computing system may redirect the connection with the client device to the application. A second message destined to the application for redirecting the connection may comprise the patched one or more authentication tokens. The application may obtain the information regarding the tenant from the patched one or more authentication tokens. As an example and not by way of limitation, continuing with a prior example, the authentication service provider 150 may determine whether the particular hook function is successfully completed. The particular hook function may be successful if the multi-tenancy module 125 determines that the received session identifier matches to the stored session identifier and patching the authentication tokens are done successfully. In response to a determination that the particular hook function is successfully completed, the authentication service provider 150 may send the patched one or more authentication tokens to the authentication client 140 at step 270. At step 275, the authentication client may send the patched one or more authentication tokens to the authorization module 123. Upon receiving the patched one or more authentication tokens, the authorization module 123 may determine whether the patched one or more authentication tokens are valid at step 280. The authorization module 123 may store the patched one or more authentication tokens to the second storage communicatively connected to the authorization module 123. At step 285, the authorization module 123 may redirect the connection with the client device 110 to the web application 130 by sending a second message to the web application 130. The second message may comprise the patched one or more authentication tokens. The web application 130 may obtain the information regarding the tenant from the patched one or more authentication tokens. At step 290, the user may access the web application 130 using the client device 110. Although this disclosure describes providing patched one or more authentication tokens to an application in a particular manner, this disclosure contemplates providing patched one or more authentication tokens to an application in any suitable manner.

Figure 3:
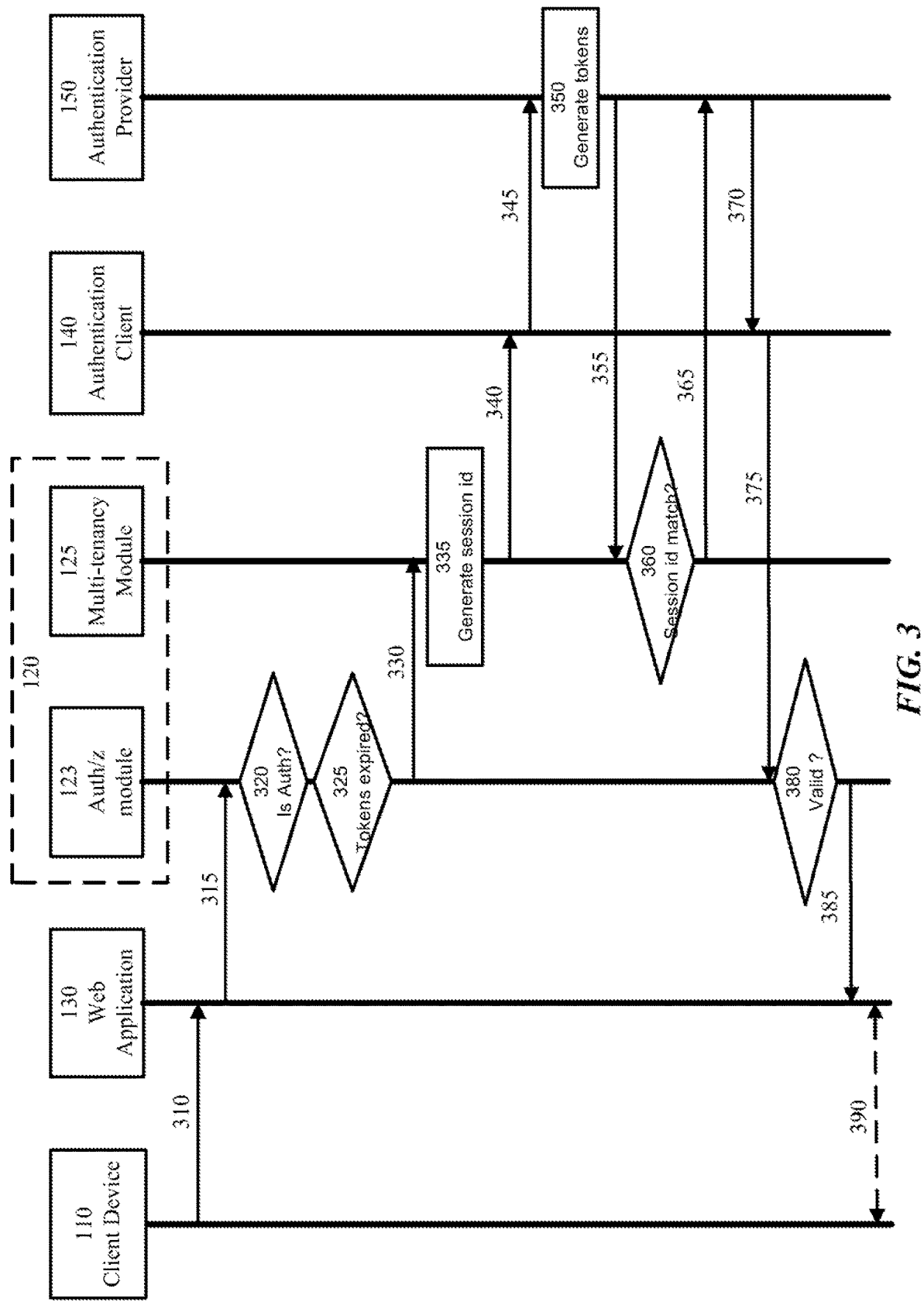
FIG. 3 illustrates an example message flow for re-issuing expired authentication tokens for an authenticated user associated with a tenant.

In particular embodiments, the computing system may receive a third message from the application indicating that the user is not authorized to access the application. A second connection with the client device associated with the user may be redirected to the computing system by the third message. The computing system may determine that the user is authenticated and the one or more tokens are expired based on records in the second storage communicatively connected to the computing system. FIG. 3 illustrates an example message flow for re-issuing expired authentication tokens for an authenticated user associated with a tenant. The example illustrated in FIG. 2 continues with FIG. 3. As an example and not by way of limitation, continuing with a prior example, at step 310 the client device 110 may send a second initial message to the web application 130. The web application 130 may determine that the user is not authorized to access the application 130 and send a response message indicting the access is not authorized. The response message may comprise HTTP '401' status code indicating that the client request has not been completed because the request lacks valid authentication credentials for the requested resource. At step 315, the gateway associated with the web application 130 may intercept the response message and forward the response message to the authorization module 123. At step 320, the authorization module 123 may determine whether the user is authenticated to access the web application 130 based on information stored at the second storage. After the authorization module 123 determines that the user is authenticated to access the web application 130, the authorization module 123 may determine whether the one or more authentication tokens used by the user to access the web application 130 are expired at step 325. Although this disclosure describes determining that user is authenticated to access an application and the one or more authentication tokens are expired in a particular manner, this disclosure contemplates determining that user is authenticated to access an application and the one or more authentication tokens are expired in any suitable manner.

In particular embodiments, in response to the determination that the user is authenticated and the one or more tokens are expired, the computing system may generate a third session identifier corresponding to the information associated with the user. The computing system may send a second notification to the authentication client that the user is trying to login using the authentication service. As an example and not by way of limitation, continuing with a prior example, upon determining that user is authenticated to access an application and the one or more authentication tokens are expired, the authorization module 123 may forward the control to the multi-tenancy module 125 at step 330. The multi-tenancy module 125 may retrieve information associated with the user from the first storage communicatively connected to the multi-tenancy module 125. The information associated with the user may comprise an identity of the user and information regarding the tenant to which the user belongs while the user is accessing the web application 130. At step 335, the multi-tenancy module 125 may generate a third session identifier corresponding to the information associated with the user. At step 340, the multi-tenancy module 125 may send a notification to the authentication client 140 indicating that the user is trying to login to the web application 130 using the authentication protocol that the authentication client 140 supports. The notification may comprise the third session identifier. At step 345, the authentication client 140 may initiate an authentication procedure by sending a message to the authentication service provider 150 comprising the third session identifier. At step 350, the authentication service provider 150 may generate one or more authentication tokens. Although this disclosure describes causing the authentication client to initiate an authentication procedure by sending a notification comprising a new session identifier in a particular manner, this disclosure contemplates causing the authentication client to initiate an authentication procedure by sending a notification comprising a new session identifier in any suitable manner.

In particular embodiments, the computing system may receive a second request from the authentication provider for authenticating a fourth session identifier. The computing system may determine that the fourth session identifier is identical to the third session identifier. In response to the determination, the computing system may cause the authentication provider to patch one or more second authentication tokens with the information regarding the tenant. As an example and not by way of limitation, continuing with a prior example, the authentication service provider 150 may call the particular hook function at step 355, which sends a second request message to the multi-tenancy module 125. The second request message may comprise the third session identifier that the authentication service provider 150 received from the authentication client 140. The multi-tenancy module 125 may retrieve the stored third session identifier and compare the retrieved third session identifier and the session identifier received within the second request message at step 360. The multi-tenancy module 125 may call one or more APIs provided by the authentication service provider 150 upon determining that the retrieved third session identifier and the received session identifier match at step 365. The one or more APIs may cause the authentication service provider 150 to patch the one or more authentication tokens associated with the session identifier with information regarding the tenant. The information regarding the tenant may comprise an identifier of the tenant, a name of the tenant, a creation time of the tenant, a last access time of the tenant, or any suitable information associated with the tenant. In particular embodiments, the one or more APIs may further cause the authentication service provider 150 to sign the patched authentication tokens associated with the session identifier with the information regarding the tenant. Although this disclosure describes causing the authentication service provider to patch one or more authentication tokens with information regarding the tenant in a particular manner, this disclosure contemplates causing the authentication service provider to patch one or more authentication tokens with information regarding the tenant in any suitable manner.

In particular embodiments, the computing system may receive the patched one or more second authentication tokens from the authentication client. The computing system may determine that the patched one or more second authentication tokens are valid. In response to the determination, the computing system may redirect the second connection with the client device to the application. A fourth message destined to the application for redirecting the second connection may comprise the patched one or more second authentication tokens. As an example and not by way of limitation, continuing with a prior example, the authentication service provider 150 may determine whether the particular hook function is successfully completed. The particular hook function may be successful if the multi-tenancy module 125 determines that the received session identifier matches to the stored session identifier and patching the authentication tokens are done successfully. In response to a determination that the particular hook function is successfully completed, the authentication service provider 150 may send the patched one or more authentication tokens to the authentication client 140 at step 370. At step 375, the authentication client may send the patched one or more authentication tokens to the authorization module 123. Upon receiving the patched one or more authentication tokens, the authorization module 123 may determine whether the patched one or more authentication tokens are valid at step 380. The authorization module 123 may store the patched one or more authentication tokens to the second storage communicatively connected to the authorization module 123. At step 385, the authorization module 123 may redirect the connection with the client device 110 to the web application 130 by sending a fourth message to the web application 130. The fourth message may comprise the patched one or more authentication tokens. The web application 130 may obtain the information regarding the tenant from the patched one or more authentication tokens. At step 390, the user may be accessing the web application 130 using the client device 110. Although this disclosure describes providing second patched one or more authentication tokens to an application in a particular manner, this disclosure contemplates providing second patched one or more authentication tokens to an application in any suitable manner.

Figure 4:
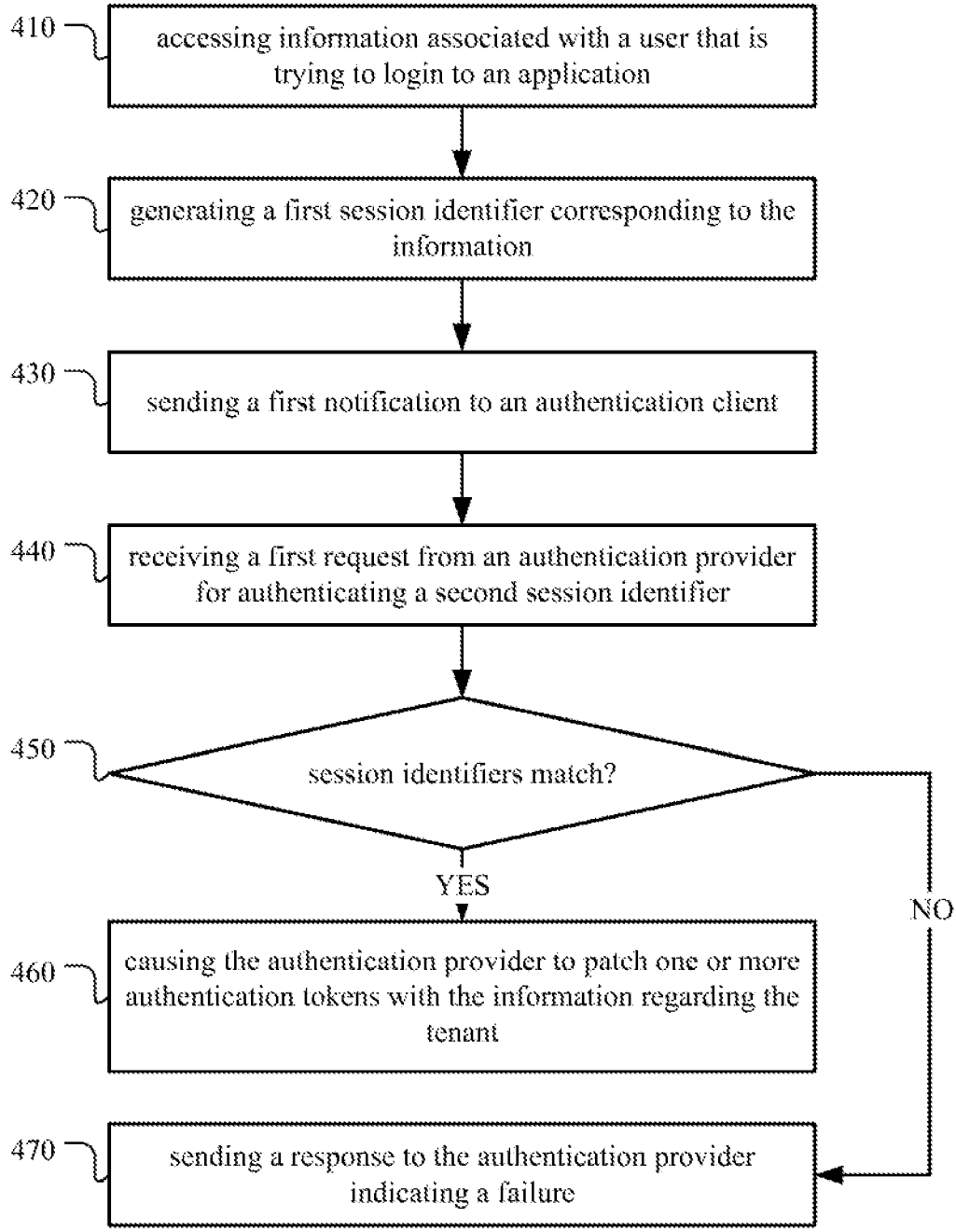
FIG. 4 illustrates an example method for enabling multi-tenanted authentication for applications.

FIG. 4 illustrates an example method 400 for provide an application with information associated with a tenant in association with a user by causing an authentication service provider to patch one or more authentication tokens with the information regarding the tenant. The method may begin at step 410, where a computing system may access information associated with a user that is trying to login to an application. The information may comprise an identity of the user and information regarding a tenant to which the user belongs. At step 420, the computing system may generate a first session identifier corresponding to the information. The first session identifier in association with the identity of the user and the information regarding the tenant may be stored to a first storage communicatively connected to the computing system. At step 430, sending a first notification to an authentication client that the user is trying to login using an authentication service. The first notification may comprise the first session identifier. At step 440, the computing system may receive a first request from an authentication provider for authenticating a second session identifier. At step 450, the computing system may determine whether the second session identifier is identical to the first session identifier by comparing the second session identifier with the stored first session identifier. At step 460, the computing device may, in response to a determination that the second session identifier is identical to the first session identifier, cause the authentication provider to patch one or more authentication tokens with the information regarding the tenant. The one or more authentication tokens may be used for accessing the application. At step 470, the computing system may, in response to a determination that the second session identifier is not identical to the first session identifier, send a response to the authentication service provider indicating a failure. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for provide an application with information associated with a tenant in association with a user by causing an authentication service provider to patch one or more authentication tokens with the information regarding the tenant including the particular steps of the method of FIG. 4, this disclosure contemplates any suitable method for provide an application with information associated with a tenant in association with a user by causing an authentication service provider to patch one or more authentication tokens with the information regarding the tenant including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
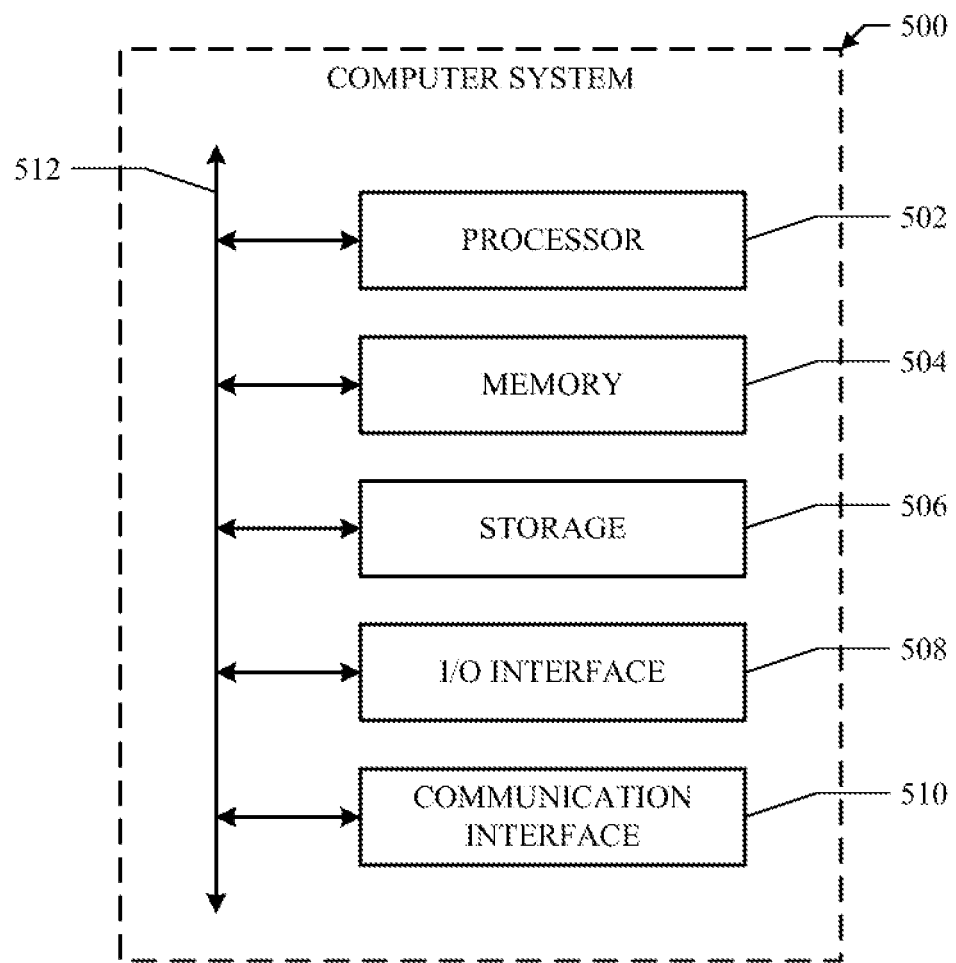
FIG. 5 illustrates an example computing system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:

accessing information associated with a user that is trying to login to an application, wherein the information comprises an identity of the user and information regarding a tenant to which the user belongs;

generating a first session identifier corresponding to the information, wherein the first session identifier in association with the identity of the user and the information regarding the tenant is stored to a first storage communicatively connected to the computing system;

sending, to an authentication client, a first notification that the user is trying to login using an authentication service, wherein the first notification comprises the first session identifier;

receiving, from an authentication provider, a first request for authenticating a second session identifier;

determining that the second session identifier is identical to the first session identifier by comparing the second session identifier with the stored first session identifier; and causing, in response to the determination, the authentication provider to patch one or more authentication tokens with the information regarding the tenant, wherein the one or more authentication tokens are used for accessing the application.

2. The method of claim 1, further comprising causing the authentication provider to sign the one or more authentication tokens with the information regarding the tenant.

3. The method of claim 1, wherein the information regarding the tenant comprises an identifier and a name of the tenant.

4. The method of claim 1, wherein the information regarding the tenant further comprises a creation time of the tenant or a last access time to the tenant.

5. The method of claim 1, wherein accessing the information associated with the user comprises:

receiving, from the application accessed by the user, a first message indicating that the user is not authorized to access the application, wherein the first message is redirected by a gateway associated with the application, wherein the first message comprises an identity of the user, and wherein the computing system has a connection with a client device associated with the user upon receiving the first message;

determining, based on records in a second storage communicatively connected to the computing system, the user is not authenticated;

receiving, from the client device, an identity information of a tenant the user is associated with while the user is accessing the application by causing the client device to present a user interface for the user to provide the identity information of the tenant; and retrieving further information regarding the tenant from the first storage communicatively connected to the computing system using the identity information of the tenant.

6. The method of claim 5, wherein the first message is an error message with an unauthorized response status code returned by the application, and wherein the first message with the unauthorized response status code is intercepted and redirected to the computing system by the gateway.

7. The method of claim 5, further comprising:

receiving, from the authentication client, the patched one or more authentication tokens;

determining that the patched one or more authentication tokens are valid; and redirecting, in response to the determination, the connection with the client device to the application, wherein a second message destined to the application for redirecting the connection comprises the patched one or more authentication tokens, and wherein the application obtains the information regarding the tenant from the patched one or more authentication tokens.

8. The method of claim 7, further comprising:

receiving, from the application, a third message indicating that the user is not authorized to access the application, wherein a second connection with the client device associated with the user is redirected to the computing system by the third message;

determining, based on records in the second storage communicatively connected to the computing system, that the user is authenticated and the one or more tokens are expired;

generating, in response to the determination that the user is authenticated and the one or more tokens are expired, a third session identifier corresponding to the information associated with the user;

sending, to the authentication client, a second notification that the user is trying to login using the authentication service;

receiving, from the authentication provider, a second request for authenticating a fourth session identifier;

determining that the fourth session identifier is identical to the third session identifier;

causing, in response to the determination, the authentication provider to patch one or more second authentication tokens with the information regarding the tenant;

receiving, from the authentication client, the patched one or more second authentication tokens;

determining that the patched one or more second authentication tokens are valid; and redirecting, in response to the determination, the second connection with the client device to the application, wherein a fourth message destined to the application for redirecting the second connection comprises the patched one or more second authentication tokens.

9. The method of claim 1, wherein the first notification causes the authentication client to initiate an authentication procedure by sending a message comprising the first session identifier request to the authentication provider.

10. The method of claim 1, wherein the authentication provider sends the first request to the computing system by calling a pre-configured inline hook.

11. The method of claim 1, wherein causing the authentication provider to patch one or more authentication tokens with the information regarding the tenant comprises calling one or more application programming interfaces (APIs) provided by the authentication provider.

12. The method of claim 1, wherein a tenant is a unique entity comprising users and configurations.

13. The method of claim 1, wherein the application is a web application.

14. The method of claim 1, wherein the authentication client is an OpenID Connect (OIDC) client.

15. The method of claim 1, wherein the authentication provider is an OIDC service provider.

16. A computing system comprising:

one or more processors; and one or more computer-readable non-transitory storage media coupled to one or more of the processors and comprising instructions operable when executed by one or more of the processors to:

access information associated with a user that is trying to login to an application, wherein the information comprises an identity of the user and information regarding a tenant to which the user belongs;

generate a first session identifier corresponding to the information, wherein the first session identifier in association with the identity of the user and the information regarding the tenant is stored to a first storage communicatively connected to the computing system;

send, to an authentication client, a first notification that the user is trying to login using an authentication service, wherein the first notification comprises the first session identifier;

receive, from an authentication provider, a first request for authenticating a second session identifier;

determine that the second session identifier is identical to the first session identifier by comparing the second session identifier with the stored first session identifier; and cause, in response to the determination, the authentication provider to patch one or more authentication tokens with the information regarding the tenant, wherein the one or more authentication tokens are used for accessing the application.

17. The computing system of claim 16, wherein the one or more processors are further operable when executing the instructions to cause the authentication provider to sign the one or more authentication tokens with the information regarding the tenant.

18. The computing system of claim 16, wherein the information regarding the tenant comprises an identifier and a name of the tenant.

19. The computing system of claim 16, wherein the information regarding the tenant further comprises a creation time of the tenant or a last access time to the tenant.

20. One or more computer-readable non-transitory storage media embodying software that is operable when executed by a computing system to:

access information associated with a user that is trying to login to an application, wherein the information comprises an identity of the user and information regarding a tenant to which the user belongs;

generate a first session identifier corresponding to the information, wherein the first session identifier in association with the identity of the user and the information regarding the tenant is stored to a first storage communicatively connected to the computing system;

send, to an authentication client, a first notification that the user is trying to login using an authentication service, wherein the first notification comprises the first session identifier;

receive, from an authentication provider, a first request for authenticating a second session identifier, determine that the second session identifier is identical to the first session identifier by comparing the second session identifier with the stored first session identifier; and cause, in response to the determination, the authentication provider to patch one or more authentication tokens with the information regarding the tenant, wherein the one or more authentication tokens are used for accessing the application.

\* \* \* \* \*